United States Patent
Lee et al.

(10) Patent No.: US 9,601,744 B2
(45) Date of Patent: *Mar. 21, 2017

(54) SECONDARY BATTERY

(71) Applicants: SAMSUNG SDI CO., LTD., Yongin-si, Gyeonggi-do (KR); ROBERT BOSCH GMBH, Stuttgart (DE)

(72) Inventors: Chiyoung Lee, Yongin-si (KR);
Seokyoon Yoo, Yongin-si (KR);
Yoontai Kwak, Yongin-si (KR);
Dongwook Kim, Yongin-si (KR);
Jongseok Moon, Yongin-si (KR);
Tatsuya Hashimoto, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 264 days.

This patent is subject to a terminal disclaimer.

(21) Appl. No.: 14/092,547

(22) Filed: Nov. 27, 2013

(65) Prior Publication Data

US 2014/0106205 A1    Apr. 17, 2014

Related U.S. Application Data

(63) Continuation of application No. 13/101,090, filed on May 4, 2011, now Pat. No. 8,617,738.

(60) Provisional application No. 61/346,299, filed on May 19, 2010.

(51) Int. Cl.
*H01M 2/26* (2006.01)

(52) U.S. Cl.
CPC ............ *H01M 2/26* (2013.01); *H01M 2/263* (2013.01)

(58) Field of Classification Search
CPC ............................................ H01M 2/26–2/266
USPC ................................................... 429/161, 211
See application file for complete search history.

(56) References Cited

U.S. PATENT DOCUMENTS

| | | | |
|---|---|---|---|
| 2003/0215706 A1 | 11/2003 | Alunans et al. | |
| 2007/0059594 A1 | 3/2007 | Jeon et al. | |
| 2007/0232123 A1 | 10/2007 | Uh | |
| 2008/0182166 A1* | 7/2008 | Aota et al. | 429/122 |
| 2009/0087735 A1 | 4/2009 | Yoon et al. | |
| 2011/0244314 A1 | 10/2011 | Lee et al. | |

FOREIGN PATENT DOCUMENTS

| | | |
|---|---|---|
| CN | 1853290 A | 10/2006 |
| CN | 101047264 A | 10/2007 |
| CN | 101399362 A | 4/2009 |
| EP | 2 043 180 A1 | 4/2009 |
| EP | 2 388 847 A1 | 11/2011 |

(Continued)

OTHER PUBLICATIONS

EPO Extended Search Report for corresponding European Patent Application No. 11166498.3, dated Sep. 9, 2011 (6 pages).
Patent Abstracts of Japan and machine English translation of JP 2005-142026, published Jun. 2, 2005.

(Continued)

*Primary Examiner* — Eugenia Wang
(74) *Attorney, Agent, or Firm* — Lewis Roca Rothgerber Christie LLP

(57) ABSTRACT

A secondary battery includes: a case; an electrode assembly housed in the case and including a first electrode, a second electrode, and a separator between the first electrode and the second electrode, the first electrode having a coating portion coated with a first active material and a non-coating portion absent the first active material; and a collector plate including first and second collector plates enmeshed together with the non-coating portion therebetween.

20 Claims, 6 Drawing Sheets

(56) References Cited

FOREIGN PATENT DOCUMENTS

| | | |
|---|---|---|
| JP | 10-106536 | 4/1998 |
| JP | 10-261441 | 9/1998 |
| JP | 2000-277154 | 10/2000 |
| JP | 2003-36834 | 2/2003 |
| JP | 2004-213937 A | 7/2004 |
| JP | 2004-214011 | 7/2004 |
| JP | 2005-142026 | 6/2005 |
| KR | 2008-0095612 A | 10/2008 |
| KR | 10-0879297 B1 | 1/2009 |
| KR | 10-2011-0127621 A | 11/2011 |

OTHER PUBLICATIONS

Patent Abstracts of Japan and machine English translation of JP10-106536, Patent Abstracts of Japan (10 pages), (date same as corresponding foreign document Apr. 24, 1998).

Patent Abstracts of Japan and machine English translation of JP2000-277154, Patent Abstracts of Japan (12 pages), (date same as corresponding foreign document Oct. 6, 2000).

Patent Abstracts of Japan and machine English translation of JP 2004-213937 A (8 pages), (date same as corresponding foreign document Jul. 29, 2004).

SIPO Office action dated Jun. 28, 2013, with English translation, for corresponding Chinese Patent application 201110130840.6, (27 pages).

EPO Search Report dated Feb. 12, 2015, for corresponding European Patent application 14193700.3, (8 pages).

U.S. Office Action dated Aug. 31, 2016 issued in cross-reference U.S. Appl. No. 14/513,112 (8 sheets).

* cited by examiner

SECONDARY BATTERY

CROSS-REFERENCE TO RELATED APPLICATIONS

This application is a continuation of U.S. application Ser. No. 13/101,090, filed May 4, 2011, now U.S. Pat. No. 8,617,738, issued on Dec. 31, 2013, entitled Secondary Battery, which claims the benefit of U.S. Provisional Application No. 61/346,299, filed on May 19, 2010, in the United States Patent and Trademark Office, the entire contents of which are incorporated herein by reference.

BACKGROUND

Field

Aspects of embodiments of the present invention relate to a secondary battery.

Related Art

In general, unlike primary batteries, which are not chargeable, secondary batteries are chargeable and dischargeable. The secondary batteries, in particular, small size batteries, are widely used in a variety, of, high-tech electronic devices such as cellular phones, notebook computers, camcorders, and the like, and bulk size (e.g., large size) batteries are used as the power source for motor drive, such as in electric vehicles or hybrid electric vehicles. The secondary battery is generally constructed to include an electrode assembly inside a case and electrode terminals connected through a collector plate welded to the electrode assembly. However, in some secondary batteries it is difficult to check welding quality from the outside and therefore welding efficiency may deteriorate.

SUMMARY

Aspects of embodiments of the present invention are directed toward a secondary battery in which welding efficiency and reliability are improved when a non-coating portion of an electrode assembly is welded to a collector plate and in which welding quality can be easily detected.

According to one embodiment of the present invention, a secondary battery includes: a case; an electrode assembly housed in the case and including a first electrode, a second electrode, and a separator between the first electrode and the second electrode, the first electrode having a coating portion coated with a first active material and a non-coating portion absent the first active material; and a collector plate including first and second collector plates enmeshed together with the non-coating portion therebetween.

The first collector plate may include a first plate and a first protrusion extending from the first plate with a first step height from the first plate, and the second collector plate may include a second plate and a second protrusion extending from the second plate with a second step height from the second plate.

The non-coating portion may be between the first protrusion and the second protrusion.

The non-coating portion may be coupled to both the first protrusion and the second protrusion by a weld between the first and second protrusions.

The weld may be a butt weld.

The weld may be at an end of the non-coating portion.

The non-coating portion may extend from the coating portion with a distance greater than the first step height or the second step height.

The non-coating portion may be welded to the collector plate in a state in which an end of the non-coating portion is coplanar with the collector plate.

The non-coating portion may be welded to the collector plate in a state in which an end of the non-coating portion extends through the collector plate.

The first collector plate may include a plurality of first protrusions, the second collector plate may include a plurality of second protrusions enmeshed with the plurality of first protrusions, and one of the plurality of first protrusions and a corresponding one of the plurality of second protrusions may be enmeshed together with the non-coating portion therebetween.

The first electrode may be wound together with the second electrode and the separator to form a jellyroll structure, and the jellyroll structure may include the non-coating portion, the non-coating portion located at a first end of the electrode assembly and between the enmeshed first and second collector plates.

The first collector plate may include a first plate and a plurality of first protrusions extending from the first plate with a first step height from the first plate.

The first plate may have a surface abutting the first end of the electrode assembly, and the plurality of first protrusions may be located within the non-coating portion.

The plurality of first protrusions may define a plurality of grooves, and the non-coating portion may include a plurality of portions partitioned by and located in the plurality of grooves.

The second collector plate may include a second plate and a plurality of second protrusions extending from the second plate with a second step height from the second plate.

The first plate may have a surface abutting the first end of the electrode assembly, the plurality of first protrusions may be located within the non-coating portion, the second plate may have a surface abutting the first end of the electrode assembly, and the plurality of second protrusions may be located within the non-coating portion.

The plurality of first protrusions may define a plurality of first grooves, the non-coating portion may include a plurality of portions first partitioned by and located in the plurality of first grooves, the plurality of second protrusions may define a plurality of second grooves, and the plurality of portions may be second partitioned by and located in the plurality of second grooves.

The non-coating portion may include a first set of non-coating portions and a second set of non-coating portions, the first set of the non-coating portions may be located between a first one of the plurality of first protrusions and a corresponding first one of the plurality of second protrusions, and the second set of the non-coating portions may be located between a second one of the plurality of first protrusions and a corresponding second one of the plurality of second protrusions.

The first set of the non-coating portions may be welded to both the first one of the plurality of first protrusions and the corresponding first one of the plurality of second protrusions by a first weld, and the second set of the non-coating portions may be welded to both the second one of the plurality of first protrusions and the corresponding second one of the plurality of second protrusions by a second weld.

The first weld and the second weld may together form a serpentine weld.

In secondary batteries according to embodiments of the present invention, in welding a collector plate to a non-coating portion of an electrode assembly, butt welding is performed in a state in which the non-coating portion is fixed between protrusions of a first collector plate and a second collector plate meshed with each other, thereby increasing welding efficiency.

In addition, in secondary batteries according to embodiments of the present invention, because welding is performed on lateral surfaces of the non-coating portion, welding quality can be easily detected externally, thereby improving welding reliability.

Further, secondary batteries according to embodiments of the present invention can increase the capacity of the electrode assembly by reducing a thickness of the non-coating portion by as much as a step height between the first collector plate and the second collector plate.

Additional aspects of embodiments of the present invention will be set forth in part in the description which follows and, in part, will be obvious from the description, or may be learned by practice of the invention.

| DESCRIPTION OF SOME OF THE SYMBOLS IN CERTAIN PORTIONS OF THE DRAWINGS | |
|---|---|
| 100: Secondary Battery | 110: Case |
| 120: Electrode Assembly | 130: Collector Plate |
| 140: Current Collecting Terminal | 150: First Dielectric |
| 160: Cap plate | 170: Second Dielectric |
| 180: Nut | |

DETAILED DESCRIPTION

Example embodiments will now be described in more detail hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

A construction of a secondary battery according to one embodiment of the present invention will now be described.

Figure 1:
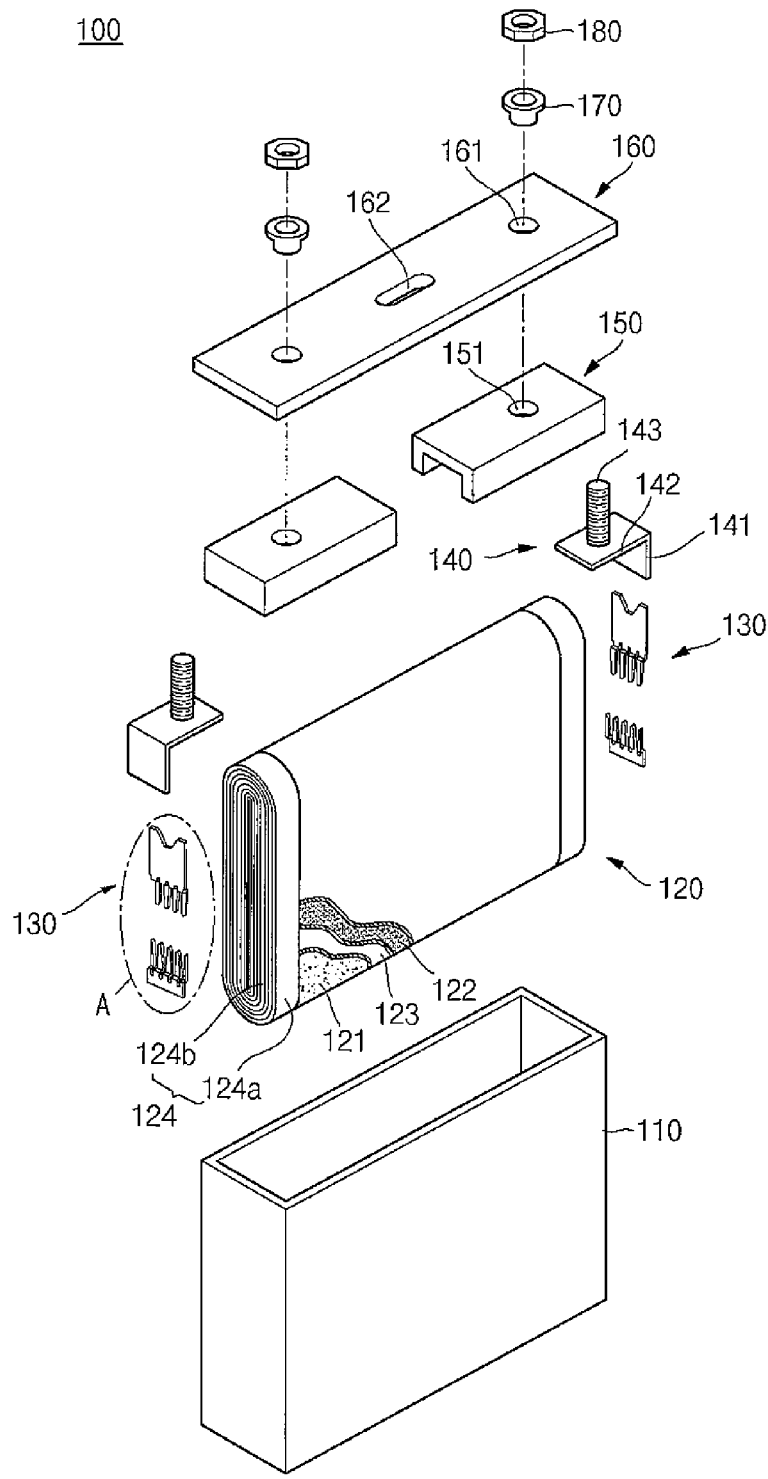
FIG. 1 is an exploded perspective view of a secondary battery according to one embodiment of the present invention.
Figure 2:
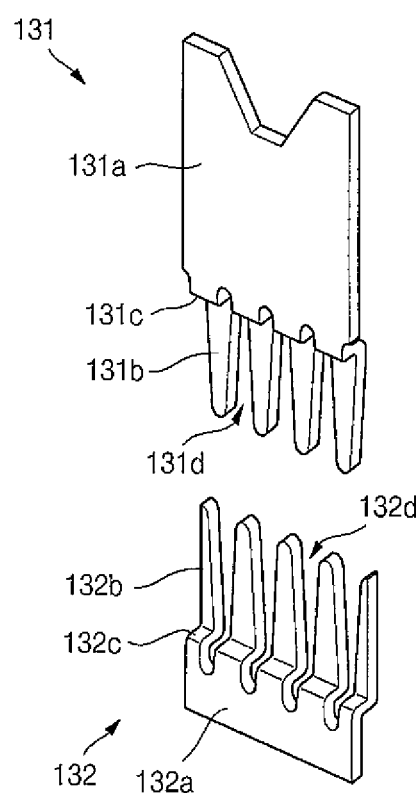
FIG. 2 is an enlarged view of a portion 'A' of FIG. 1 according to one embodiment of the present invention.
Figure 3:
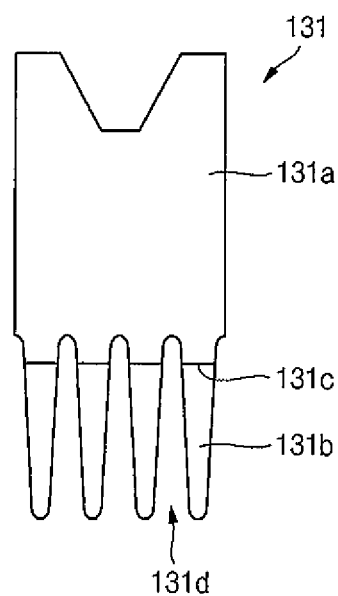
FIG. 3 is a front view of a first collector plate used in the secondary battery shown in FIG. 1 according to one embodiment of the present invention.
Figure 4:
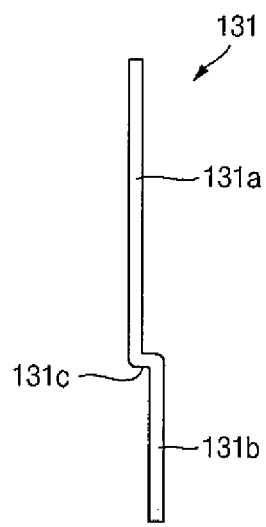
FIG. 4 is a side view of a first collector plate used in the secondary battery shown in FIG. 1 according to one embodiment of the present invention.
Figure 5:
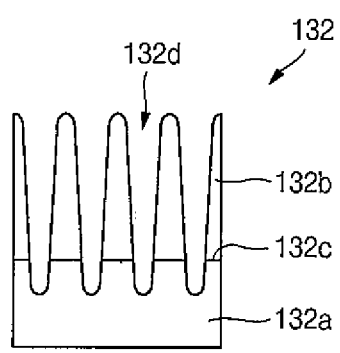
FIG. 5 is a front view of a second collector plate used in the secondary battery shown in FIG. 1 according to one embodiment of the present invention.
Figure 6:
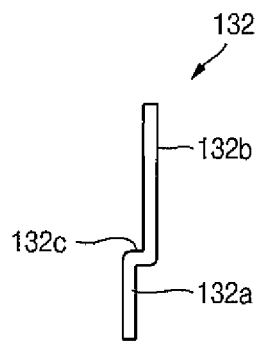
FIG. 6 is a side view of a second collector plate used in the secondary battery shown in FIG. 1 according to one embodiment of the present invention.

FIG. 1 is an exploded perspective view of a secondary battery according to one embodiment of the present invention, FIG. 2 is an enlarged view of a portion 'A' of FIG. 1 according to one embodiment of the present invention, FIG. 3 is a front view of a first collector plate used in the secondary battery shown in FIG. 1 according to one embodiment of the present invention, FIG. 4 is a side view of a first collector plate used in the secondary battery shown in FIG. 1 according to one embodiment of the present invention, FIG. 5 is a front view of a second collector plate used in the secondary battery shown in FIG. 1 according to one embodiment of the present invention, and FIG. 6 is a side view of the second collector plate used in the secondary battery shown in FIG. 1, according to one embodiment of the present invention.

Referring to FIGS. 1 through 6, a secondary battery 100 according to one embodiment of the present invention includes a case 110, an electrode assembly 120 housed inside the case 110, a collector plate 130 electrically connected to the electrode assembly 120, a current collecting terminal 140 electrically connected to the collector plate 130, a first dielectric 150 through which the current collecting terminal 140 penetrates, a cap plate 160 coupled to an upper side of the first dielectric 150, and a second dielectric 170 penetrating through the cap plate 160 and coupled to the current collecting terminal 140. A nut 180 may further be coupled to the current collecting terminal 140.

The case 110 may have the shape of a hexahedron (e.g., rectangular prism) or shapes having an inner space to receive (e.g., to contain) the electrode assembly 120. In addition, the case 110 is made of conductive metal, for example, steel coated with aluminum, aluminum alloy or nickel.

The electrode assembly 120 is housed inside the case 110. The electrode assembly 120 is constructed such that a separator 123 is located between a positive electrode 121 and a negative electrode 122. In a state in which the positive electrode 121, the separator 123 and the negative electrode 122 are stacked, the electrode assembly 120 is formed to have a jellyroll shape in which the stacked structure in which the positive electrode 121, the separator 123 and the negative electrode 122 are wound together into a jellyroll configuration. In the embodiment shown in FIG. 1, for brevity of explanation, only a single electrode assembly 120 is provided inside the case 110, but it should be understood that a plurality of electrode assemblies 120 may be provided inside the case 110.

In addition, the electrode assembly 120 includes a non-coating portion 124 (or uncoated portion) at either end of the case 110. The non-coating portion 124 is formed in pair, that is, a first portion of the non-coating portion 124 is formed at a first end of the electrode assembly 120 to be connected to the positive electrode plate 121, and a second portion of the non-coating portion 124 is formed at a second end of the electrode assembly 120 to be connected to the negative electrode plate 122.

The non-coating portion 124 is arranged to correspond to the shape of the collector plate 130 and to be coupled to the collector plate 130. The non-coating portion 124 may be coupled to the collector plate 130 by welding in a state in which it is coplanar with the collector plate 130 or in which it upwardly protrudes from the collector plate 130. In this arrangement, a welding state of the non-coating portion 124 can be externally and easily checked (e.g., external checking of welding quality is facilitated) and welding reliability is improved. In addition, because the welding is performed in a state in which the non-coating portion 124 is exposed to the outside, and, in particular, butt welding is used as the welding method, welding efficiency may further be increased. Further, because the welding is performed at the end surface 124b of the non-coating portion 124 coupled to the collector plate 130, it is possible to reduce the likelihood of or prevent welding beams from reaching the electrode assembly 120, thereby improving product reliability.

The collector plate 130 is coupled to an end 124b of the non-coating portion 124. The collector plate 130 is coupled to at least one of portions of the non-coating portions 124 connected to the positive electrode plate 121 and the negative electrode plate 122 by welding. In the following description, a coupling process of the collector plate 130 with the non-coating portion 124, specifically, with one of the portions of the non-coating portion 124 connected to the positive electrode plate 121, will be described by way of example.

The collector plate 130 is coupled to a portion of the non-coating portion 124 connected to the positive electrode plate 121 in pair. The collector plate 130 includes a first collector plate 131 and a second collector plate 132 coupled to the non-coating portion 124 in pair.

As shown in the embodiment of FIG. 2, the first collector plate 131 includes a first plate 131a, and first protrusions 131b extending from the first plate 131a in a first direction (e.g., in a vertical direction).

The first plate 131a is positioned substantially perpendicular to the side surface 124a of the non-coating portion 124, and the first protrusions 131b protrude in the non-coating portion 124 along the first direction. Here, each of the first protrusions 131b is formed to have a step height 131c from the first plate 131a. Thus, the first protrusions 131b are positioned within the non-coating: portion 124, and places the non-coating portion 124 in the grooves 131d formed at both sides of the first protrusions 131b in a partitioned manner. In addition, the first protrusions 131b of the first collector plate 131 securely fix the non-coating portion 124 in mesh with the second collector plate 132, and in such a state, the first protrusions 131b are coupled to the non-coating portion 124 by welding. Here, since the non-coating portion 124 (e.g., the end 124b of the non-coating portion) is positioned within the grooves 131d along the first protrusions 131b, the welding is performed at edge portions of the first protrusions 131b.

The second collector plate 132 is coupled to the first collector plate 131 in mesh therewith while the non-coating portion 124 is placed between the first collector plate 131 and the second collector plate 132, which are coupled to each other. The second collector plate 132 includes a second plate 132a, and a second protrusion 132b extending from the second plate 132a along the first direction. The second plate 132a is positioned substantially perpendicular to the side surface 124a of the non-coating portion 124 so as to correspond to (e.g., along the same plane as) the first plate 131a of the first collector plate 131. The second protrusion 132b is formed to have a step height 132c from the second plate 132a. Thus, the second protrusion 132b is placed within the non-coating portion 124, and places the non-coating portion 124 into the grooves 132d formed at its both sides in a partitioned manner. Here, the second protrusion 132b has a shape corresponding to that of the first protrusion 131b, and is meshed with and coupled to the first protrusion 131b of the first collector plate 131. Thus, the non-coating portion 124 is positioned at a region where the first protrusion 131b of the first collector plate 131 and the second protrusion 132b of the second collector plate 132 are meshed with each other, followed by welding. As such, welding efficiency and reliability may be improved during welding of the non-coating portion 124.

The current collecting terminal 140 is connected to the collector plate 130. Specifically, the current collecting terminal 140 is connected to the first plate 131a of the first collector plate 131 by welding. The current collecting terminal 140 is attached to or welded to a surface of the first plate 131a of the collector plate 130 facing oppositely away from the surface of the collector plate 130 that is coupled to or contacting the non-coating portion 124.

The current collecting terminal 140 includes a first plate 141 coupled to the collector plate 130 in the first direction, a second plate 142 extending from the first plate 141 in a second direction perpendicular to the first direction, and an electrode terminal 143 upwardly protruding from the second plate 142 in the first direction. The electrode terminal 143 upwardly protrudes through the cap plate 160 to then be connected to a charge/discharge circuit. In addition, a male thread may be provided on the outer circumference of the electrode terminal 143 to be engaged with the nut 180 in a subsequent process.

The first dielectric 150 is located at an upper side of the current collecting terminal 140. The first dielectric 150 is placed between the second plate 142 of the current collecting terminal 140 and the cap plate 160. The first dielectric 150 electrically separates (e.g., insulates) the current collecting terminal 140 from the cap plate 160. In addition, the first dielectric 150 includes a terminal hole 151 formed therein, so that the electrode terminal 143 of the current collecting terminal 140 may extend through the terminal hole 151 to protrude upwardly toward the cap plate 160.

The cap plate 160 is located at the upper side of the case 110 to hermetically seal the case 110. The cap plate 160 is coupled to, the case 110 and protects against leakage of an electrolyte contained within the case 110. The cap plate 160 includes a terminal hole 161 formed therein, so that the electrode terminal 143 may extend through the terminal hole 161 to protrude upwardly.

The cap plate 160 may include a vent 162 formed substantially at its center. When gas is generated inside the case 110 due to overcharge, the vent 162 is opened earlier than the other parts, thereby exhausting the gas.

The second dielectric 170 is formed between the cap plate 160 and the electrode terminal 143 of the current collecting terminal 140. The second dielectric 170 electrically separates (e.g., insulates) the cap plate 160 from the electrode terminal 143 of the current collecting terminal 140. In addition, because the second dielectric 170 is also located at an upper portion of the cap plate 160, it may electrically separate (e.g., insulate) the cap plate 160 and the nut 180 from each other when the nut 180 is engaged with the cap plate 160.

The nut 180 is located at an upper side of the second dielectric 170. The nut 180 has a female thread provided therein to be coupled to the male thread of the electrode terminal 143 of the current collecting terminal 140. The nut 180 securely fixes the electrode terminal 143 of the current collecting terminal 140, thereby fixing positions of the current collecting terminal 140 and the electrode assembly 120.

Hereinafter, a method in which a collector plate and a non-coating portion are coupled to each other in a secondary battery according to one embodiment of the present invention will now be described in more detail.

Figure 7:
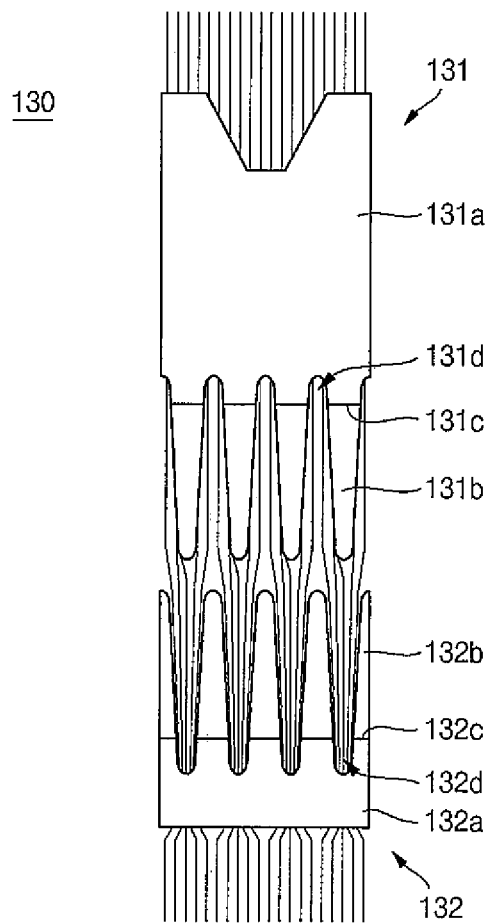
FIGS. 7 and 8 illustrate a procedure in which a collector plate and a non-coating portion are coupled to each other in a secondary battery according to one embodiment of the present invention.
Figure 8:
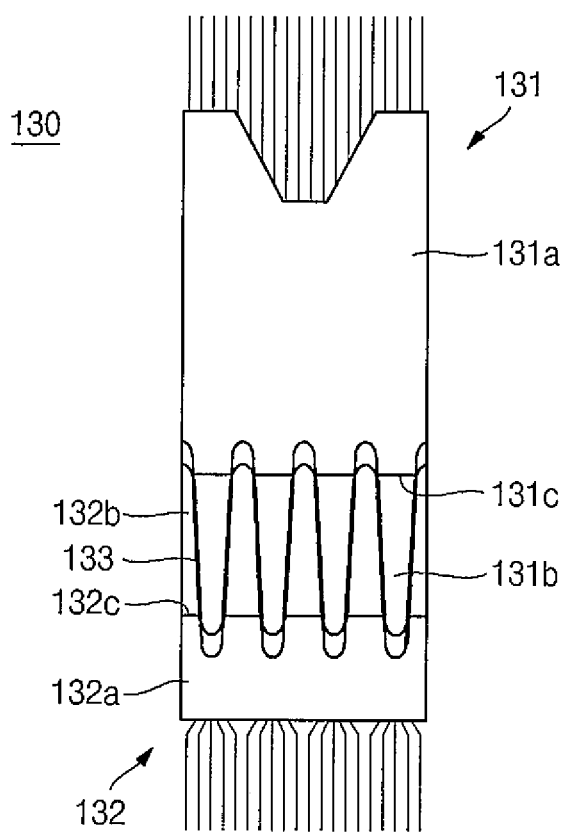

FIGS. 7 and 8 illustrate a procedure in which a collector plate and a non-coating portion are coupled to each other in a secondary battery according to one embodiment of the present invention.

Referring first to the embodiment illustrated in FIG. 7, in the secondary battery 100, the non-coating portion 124 is partitioned by the first protrusions 131b of the first collector plate 131. The first protrusions 131b, each having a step height 131c, are inserted into the non-coating portion 124, and the non-coating portion 124 is partitioned along edge portions of the first protrusions 131b. That is to say, the non-coating portion 124 (e.g., edges along the end 124b of the non-coating portion 124) is positioned inside the grooves 131d located at both sides of each of the first protrusions 131b.

The non-coating portion 124 is also partitioned by the second protrusions 132b of the second collector plate 132. Because each of the second protrusions 132b has a step height 132c, the second protrusions 132b are inserted into the non-coating portion 124. Thus, the non-coating portion 124 (e.g., edges along the end 124b of the non-coating portion 124) is partitioned along edge portions of the second protrusion 132b and is positioned in the grooves 132d formed at both sides of each of the second protrusion 132b.

Referring to FIG. 8, the first collector plate 131 and the second collector plate 132 are moved along a first direction to then be coupled to each other. Here, because the first collector plate 131 and the second collector plate 132, which have the first protrusions 131b and the second protrusions 132b, respectively, are coupled to each other while the first protrusions 131b and the second protrusions 132b are meshed with the corresponding grooves 131d and 132d, respectively, the non-coating portion 124 is positioned between the first collector plate 131 and the second collector plate 132 in mesh with each other via their respective protrusions 131b and 132b.

In addition, butt welding may be performed in a state in which the non-coating portion 124 is placed between the first collector plate 131 and the second collector plate 132, thereby forming a welding portion 133. Because the welding is performed after the non-coating portion 124 is exposed to the outside, welding efficiency may be increased. Further, because the welding portion 133 is exposed to an end surface 124b of the non-coating portion 124, welding quality can be easily checked from the outside and welding reliability may be increased. Moreover, because welding beams irradiated when welding is performed are incapable of being transmitted to the inside of the non-coating portion 124, product reliability can be increased.

As described above, in the secondary battery 100 according to one embodiment of the present invention, the collector plate 130 is welded to an end portion 124b of the non-coating portion 124 of the electrode assembly 120 using butt welding in a state in which the non-coating portion 124 is securely fixed between the first protrusions 131b of the first collector plate 131 and the second protrusions 132b of the second collector plate 132 in mesh with each other, thereby increasing welding efficiency. In addition, the welding portion 133 can be easily checked from the outside, thereby increasing welding reliability. Further, because the non-coating portion 124 has a thickness corresponding to the step height 131c or 132c of the first collector plate 131 or the second collector plate 132, the capacity of the electrode assembly 120 can be increased by reducing the thickness of the non-coating portion 124.

Although embodiments of the present invention have been shown and described, it will be understood by those of ordinary skill in the art that various changes in form and details may be made without departing, from the spirit and scope of the present invention as set forth in the following claims and equivalents thereof.

What is claimed is:

1. A secondary battery comprising:
a case;
an electrode assembly housed in the case and comprising
a first electrode, a second electrode, and a separator between the first electrode and the second electrode, the first electrode having a coating portion coated with a first active material and a non-coating portion absent the first active material on an edge portion of the coating portion;
a first collector plate; and
a second collector plate,
wherein the first collector plate, the second collector plate, and the non-coating portion are enmeshed together to cover the edge portion of the coating portion at a weld, and
wherein the weld has a width and a length, the width of the weld being less than the length of the weld, the length of the weld extending along a length of an edge of the first electrode, the length of the edge of the first electrode being greater than a width of the edge of the first electrode.

2. The secondary battery of claim 1, wherein the weld is continuous across the first and second collector plates.

3. The secondary battery of claim 1, wherein the first collector plate, the second collector plate, and the non-coating portion are enmeshed together to completely cover the edge portion of the coating portion at the weld.

4. The secondary battery of claim 1, wherein:
the first collector plate comprises a first plate and a first protrusion extending from the first plate with a first step height from the first plate, and
the second collector plate comprises a second plate and a second protrusion extending from the second plate with a second step height from the second plate.

5. The secondary battery of claim 4, wherein the non-coating portion is between the first protrusion and the second protrusion.

6. The secondary battery of claim 5, wherein the non-coating portion is coupled to both the first protrusion and the second protrusion by the weld.

7. The secondary battery of claim 6, wherein the weld is a butt weld.

8. The secondary battery of claim 6, wherein the weld is at an end of the non-coating portion.

9. The secondary battery of claim 5, wherein the non-coating portion extends from the coating portion with a distance greater than the first step height or the second step height.

10. The secondary battery of claim 1, wherein the non-coating portion is welded to the first and second collector plates in a state in which an end of the non-coating portion is coplanar with the first and second collector plates.

11. The secondary battery of claim 1, wherein the non-coating portion is welded to the first and second collector plates in a state in which an end of the non-coating portion extends through the first and second collector plates.

12. The secondary battery of claim 1, wherein:
the first collector plate comprises a plurality of first protrusions,
the second collector plate comprises a plurality of second protrusions enmeshed with the plurality of first protrusions, and
one of the plurality of first protrusions and a corresponding one of the plurality of second protrusions are enmeshed together with the non-coating portion therebetween.

13. The secondary battery of claim 12, wherein:
the first collector plate comprises a first plate, and
the plurality of first protrusions extend from the first plate with a first step height from the first plate.

14. The secondary battery of claim 13, wherein:
the first plate has a surface abutting a first end of the electrode assembly, and
the plurality of first protrusions are located within the non-coating portion.

15. The secondary battery of claim 13, wherein:
the plurality of first protrusions define a plurality of grooves, and
the non-coating portion comprises a plurality of portions partitioned by and located in the plurality of grooves.

16. The secondary battery of claim 13, wherein:
the second collector plate comprises a second plate, and
the plurality of second protrusions extend from the second plate with a second step height from the second plate.

17. The secondary battery of claim 16, wherein:
the first plate has a surface abutting a first end of the electrode assembly,
the plurality of first protrusions are located within the non-coating portion,
the second plate has a surface abutting the first end of the electrode assembly, and
the plurality of second protrusions are located within the non-coating portion.

18. The secondary battery of claim 16, wherein:
the plurality of first protrusions define a plurality of first grooves,
the non-coating portion comprises a plurality of portions first partitioned by and located in the plurality of first grooves,
the plurality of second protrusions define a plurality of second grooves, and
the plurality of portions are second partitioned by and located in the plurality of second grooves.

19. The secondary battery of claim 16, wherein:
the non-coating portion comprises a first set of non-coating portions and a second set of non-coating portions,
the first set of the non-coating portions is located between a first one of the plurality of first protrusions and a corresponding first one of the plurality of second protrusions, and
the second set of the non-coating portions is located between a second one of the plurality of first protrusions and a corresponding second one of the plurality of second protrusions.

20. The secondary battery of claim 19, wherein:
the first set of the non-coating portions is welded to both the first one of the plurality of first protrusions and the corresponding first one of the plurality of second protrusions by a first weld, and
the second set of the non-coating portions is welded to both the second one of the plurality of first protrusions and the corresponding second one of the plurality of second protrusions by a second weld.

* * * * *